United States Patent Office 3,439,063
Patented Apr. 15, 1969

---

3,439,063
RADIATION INDUCED GRAFTING OF STYRENE/BUTADIENE ONTO A POLYETHYLENE TEREPHTHALATE SUBSTRATE
Patrick J. Reilly, Akron, Ohio, assignor to The Goodyear Tire & Rubber Company, Akron, Ohio, a corporation of Ohio
Filed June 16, 1967, Ser. No. 646,728
Int. Cl. C08f 3/18, 29/10; C08g 49/04
U.S. Cl. 260—873   6 Claims

ABSTRACT OF THE DISCLOSURE

When styrene/butadiene is graft polymerized to polyethylene terephthalate tire cord, good cord-rubber adhesion is achieved. Liquid monomers produce higher grafts per dose with cord while amorphous fibers graft more efficiently with the vapor phase monomer. The graft level and ultimate cord-rubber adhesion are maximized at feed levels of approximately 40% butadiene. Maximum adhesion is achieved at low graft levels. This surface or boundary property adhesion is maximized by grafting with accelerated electrons (minimum penetration) rather than gamma radiation (deep penetration).

BACKGROUND

Figure 1:
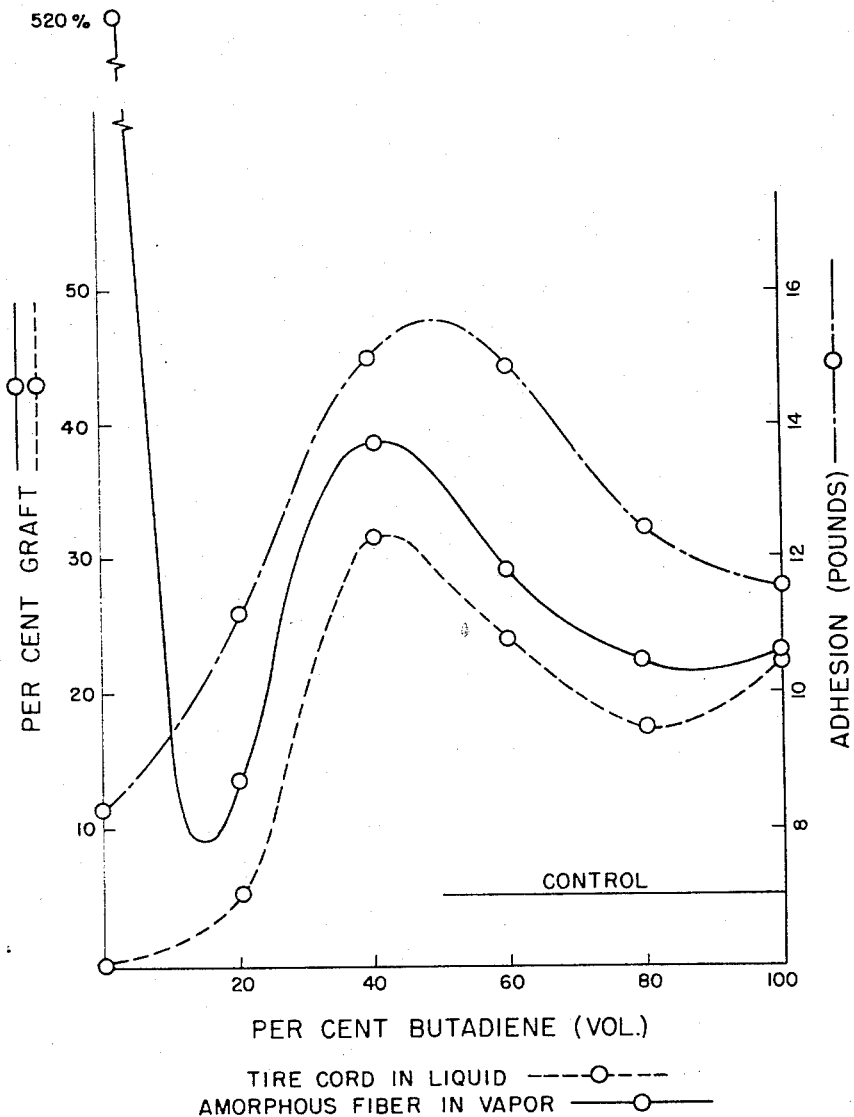

This invention relates to a method of improving cord-rubber adhesion. More specifically it relates to a method of improving the cord-rubber adhesion by grafting styrene/butadiene to polyethylene terephthalate cord. It also relates to polyethylene terephthalate cord to which styrene/butadiene has been grafted.

Grafting vinyl monomers to polyethylene terephthalate is presently known as a method of improving the terephthalate properties. Dienes have also been grafted, including, for example, chloroprene, isoprene and butadiene. Such grafting is very important in the case of tire cords when the grafted polymer readily combines with the tire carcass rubbers, since this clearly improves the cord-to-rubber bond.

SUMMARY

Applicant's invention consists of the discovery that mixtures of styrene/butadiene monomer may be radiation grafted to polyethylene terephthalate (PET) and that this grafted polymer is particularly useful in improving the adhesion of the grafted PET to rubber, especially the conventional carcass rubbers which customarily contain some styrene/butadiene rubber.

Applicant's invention also consists of the discovery of styrene/butadiene grafted PET, particularly when the styrene/butadiene molar ratio is between 80:20 and 20:80 and the styrene/butadiene graft is between 0.1 and 50% by weight of the total grafted polymer.

DETAILED DESCRIPTION

In practicing applicant's invention the conventional and now well known sources of ionizing or radiant energy are employed to activate graft sites on the polyethylene terephthalate (PET) backbone. These include gamma, electron, ultraviolet and corona discharge sources. The radiation dose employed may be between .01 and 100 megarads (mr.), and preferably will be between 0.1 and 2.0 mr. The dose rate may vary over a wide range between about .01 and 1000 mr. per hour. Any of the well established radiation techniques such as the trapped radical (pre-irradiated in the absence of oxygen), peroxidative (pre-irradiated in the presence of oxygen), or contact method may be employed. The contact method is preferred with drawn PET tire cord.

High vacuum in the order of about $10^{-3}$ mm. of mercury is advantageous if the monomer is employed in the vapor phase. The vacuum system is preferred but not essential if the liquid phase monomer is used.

The PET fiber used in practicing the invention may be either undrawn (in which case vapor phase grafting is most efficient) or drawn, as in the case of the conventional tire cord (in which case the liquid phase grafting is most efficient).

Example 1

PET tire cord and undrawn PET fibers were placed in glass ampoules in contact with the styrene/butadiene monomer, the air extracted, and the container sealed. The container was exposed to irradiation from a cobalt 60 source in accordance with the rate and dose indicated. After grafting, the homopolymer was removed by 48-hours extraction in boiling benzene after which the grafted polymer was washed with boiling methanol and dried under high vacuum at 100° C. The percent weight gain was taken as percent graft. The data in Table I shows that grafting is possible by vapor and liquid contact systems and that adhesion improvement results therefrom.

TABLE I

| PET form | Type of graft | Percent graft | Adhesion (lbs.)[1] |
|---|---|---|---|
| Tire cord | None | 0 | 4.0 |
| Do | Vapor contact | 25 | 8.2 |
| Undrawn fiber | do | 23 | |
| Do | Liquid contact | 28 | |
| Tire cord | do | 35 | 11.0 |

[1] Three-sixteenths inch U-Ad to black loaded tire carcass stock containing 40 phr. natural rubber and 60 phr. styrene-butadiene rubber cured 15 minutes at 300° F.
Ca. 1:1 vol. styrene butadiene, dose rate 0.02 mr./hr., total dose 0.5 mr.

Example 2

Additional samples prepared by the techniques disclosed in Example 1 were irradiated.

The effect of extracting homopolymer with benzene after irradiation grafting is shown in Table II.

TABLE II

| Type of graft | Percent graft | Extracted | Adhesion (lbs.)[1] |
|---|---|---|---|
| Vapor contact | 34.4 | No | 26.5 |
| Do | 32.4 | Yes | [2] 38 |
| Liquid contact | 64 | No | 33.6 |
| Do | 58 | Yes | 34.3 |

[1] ½ inch U-Ad to black loaded tire carcass stock containing 40 phr. natural rubber and 60 phr. styrene-butadiene rubber cured 30 minutes at 300° F., control (untreated) adhesion=12.7 lbs.
[2] Break strength.
Ca. 1:1 vol. styrene/butadiene, dose rate 0.02 mr./hr., total dose 1.0 mr., all grafts to PET tire cord.

The fact that extraction (48 hrs. in boiling benzene) of the vapor grafted cord increases the ultimate adhesion supports the view that the permanent weight gain represents true (chemically bonded) grafting. When the extraction procedure is omitted part of the rubber stock adheres to unbound homopolymer which is readily separable from the cord and leads to lower adhesion values. A smaller difference is observed in the liquid phase grafts because the liquid monomers act as extraction solvent for the surface homopolymers.

With undrawn fiber the results shown in Table III were obtained.

TABLE III

| Type of graft | Dose (mr.) | Percent graft |
|---|---|---|
| Liquid contact | 1.0 | 34.4 |
| Vapor contact | 1.0 | 110 |

The large increase (threefold) in graft level was obtained by irradiating the fiber while in contact with monomer vapor rather than liquid. This contrasts with the results obtained with tire cord (oriented PET) were liquid phase grafting gave double the graft level obtained with vapor grafting.

Example 3

Tire cord and undrawn fiber were grafted under conditions of varying styrene/butadiene ratio to observe the effect of this quantity on the graft level and ultimate adhesive properties of the PET. Samples were prepared on a vacuum line by distilling measured quantities of styrene and butadiene into Pyrex vessels containing the polyester fiber and tire cord. The tire cord was in contact with the liquid phase and the amorphous fiber in the vapor since these were the most effective grafting methods for each particular form of PET. After sealing off the ampoules under high vacuum, they were irradiated at room temperature to a total dose of 1.2 mr. (dose rate 0.02 mr./hr.). The results of these experiments are presented in Table IV and are plotted in FIGURE 1.

TABLE IV

| Feed ratio (vol. percent BD) | PET form | Percent graft | Adhesion (lbs.)[1] |
|---|---|---|---|
| 0 | TC | 0 | 8.3 |
| 0 | UF | 520 | |
| 20 | TC | 5.1 | 11.2 |
| 20 | UF | 13.3 | |
| 40 | TC | 31.6 | 15 |
| 40 | UF | 38.7 | |
| 60 | TC | 24.0 | 14.9 |
| 60 | UF | 29.1 | |
| 80 | TC | 17.4 | 12.5 |
| 80 | UF | 22.7 | |
| 100 | TC | 22.4 | 11.6 |
| 100 | UF | 22.9 | |

[1] 3/16 inch U-Ad to black loaded tire carcass stock containing 40 phr. natural rubber and 60 phr. styrene-butadiene rubber, cured 30 minutes at 300° F., control (untreated tire cord) adhesion=7.3 lbs.
TC=Tire cord; UF=Undrawn fiber.

The fact that the vapor and liquid phase grafts have their maxima at the same feed composition is unexpected since the composition of the vapor is different from that of the liquid. The concentration of butadiene in the vapor is much greater than that of styrene since at room temperature it has a much higher vapor pressure.

Maximum adhesion was observed when the feed was about 40–50% (vol.) butadiene. Varying the graft level under fixed (optimum) feed conditions indicates that best adhesion is obtained at low graft levels and, hence, the composition of the grafted copolymer plays an important role.

Example 4

Figure 2:
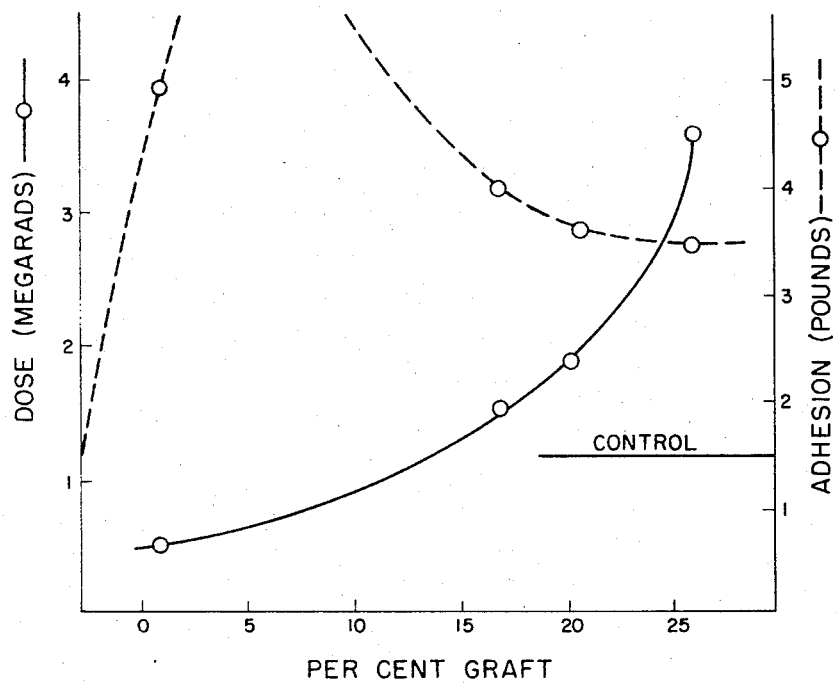

Tire cord in 40% vol. butadiene in styrene (liquid phase) was irradiated at a dose rate of 0.77 mr./hr. for varying times. The data obtained are summarized in Table V and plotted in FIGURE 2.

TABLE V

| Dose (mr.) | Percent graft | Adhesion (lbs.)[1] |
|---|---|---|
| 0.53 | 0.8 | 4.9 |
| 1.54 | 16.9 | 4.0 |
| 1.91 | 20.3 | 3.6 |
| 3.61 | 25.8 | 3.5 |
| 0 (control) | 0 | 1.5 |

[1] 3/16 inch U-Ad to black loaded tire carcass stock containing 50 phr. natural rubber, 30 phr. styrene-butadiene rubber, and 20 phr. cis-poly-butadiene rubber, cured 15 minutes at 300° F., cord pulled at 250° F.

Maximum adhesion occurs at low graft levels which indicates that the optimum adhesion observed at 40% vol. butadiene is a function of graft composition as well as graft level.

Example 5

Figure 3:
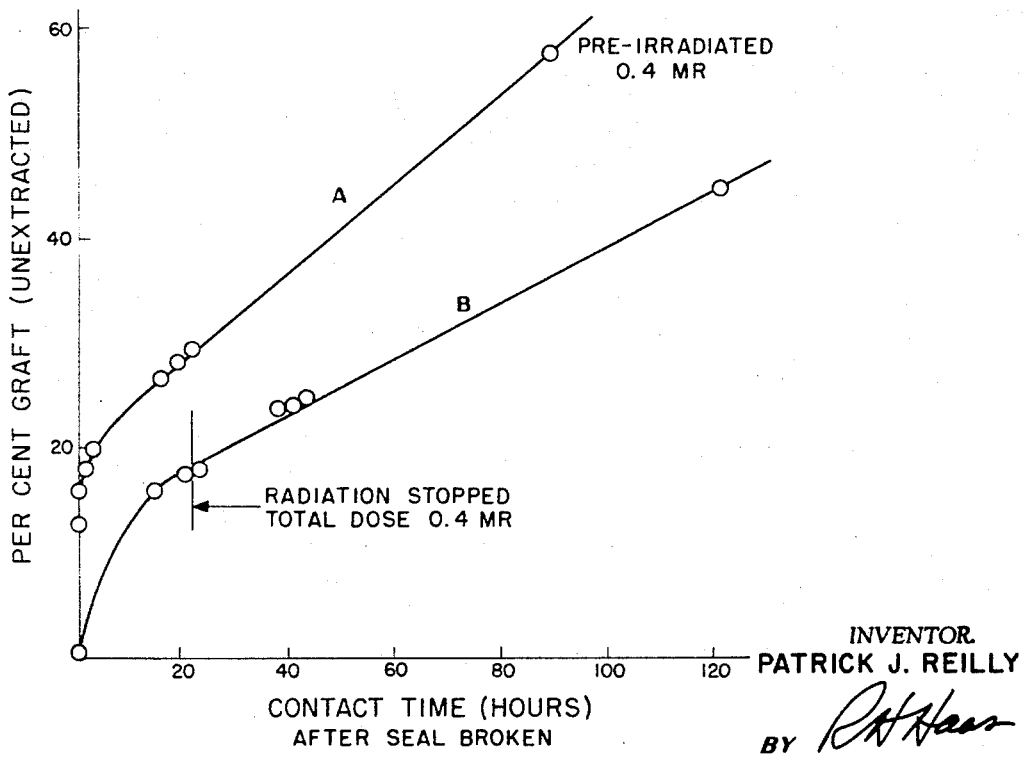

A series of runs were made where PET cord was preirradiated in high vacuum and subsequently contacted with styrene/butadiene monomer (curve A, FIG. 3) or was given a time-limited exposure to radiation while in contact with the monomer (curve B, FIG. 3).

In curve A the PET received all of the radiation dose (0.4 mr.) prior to the vapor contact period. The ultimate graft observed (76%) may indicate that the presence of monomer (styrene) may actually quench the free-radical formation process in polyester. Two slopes are recognizable: the initial (greater) slope is probably attributable to radiation produced radicals but the second (lower) slope might be due to a different species and may be only partially attributable to the irradiation process.

In curve B the irradiation (0.4 mr.) took place during part of the contact period. Upon termination of the radiation, graft uptake continued at an undiminished rate indicating that diffusion is probably the rate controlling process. In this case, the ultimate graft was 56% indicating that only small radiation doses are required to achieve appreciable graft levels.

Example 6

Exposure in air of amorphous PET fiber to negative ion bombardment from a 30–40 kv. field led to a graft of 24.3% upon subsequent styrene contact. Irradiation was for 1 hour at room temperature and styrene contact was for 18 hours at 50° C. An unirradiated control which was subjected to the same contact conditions gave a graft of 8.1%.

Since activation in this case is by low energy ions almost no penetration of the PET takes place. This is in contrast to gamma rays which are highly penetrating and is a possible method of achieving surface grafts. Such a method would be more efficient when modifications of surface properties are being sought since many of the gamma-induced (homogeneous) grafts are contained (ineffectually) within the fibers. High energy electrons (from an electron accelerator) would also be effective surface initiators.

While certain representative embodiments and details have been shown for the purpose of illustrating the invention, it will be apparent to those skilled in this art that various changes and modifications may be made therein without departing from the spirit or scope of the invention.

What is claimed is:
1. The method of radiation induced graft polymerization of styrene/butadiene monomers onto a polyethylene terephthalate substrate wherein the styrene/butadiene monomer mixture has a molar ratio between 80:20 and 20:80.
2. The method according to claim 1 wherein the styrene/butadiene is in the liquid phase.
3. The method according to claim 1 wherein the radiation dose is between .01 and 100 mr.
4. The method according to claim 1 wherein the radiation dose is between .01 and 100 mr., the polymerization temperature is between −30° C. and 100° C. and the styrene/butadiene is in a liquid phase.
5. A graft polymer consisting of a polyethylene terephthalate backbone and a styrene/butadiene graft wherein the molar ratio of the styrene/butadiene is between 80:20 and 20:80.
6. The graft polymer of claim 5 wherein the grafted portion is between 0.1 and 50 percent by weight of the total grafted polymer.

References Cited

UNITED STATES PATENTS 2,907,675 10/1959 Gaylord _____ 204—159.15
3,188,228 6/1965 Magat et al. _____ 204—159.15

MURRAY TILLMAN, Primary Examiner.

R. B. TURNER, Assistant Examiner.

U.S. Cl. X.R.

204—159.15